United States Patent Office 2,751,181
Patented June 19, 1956

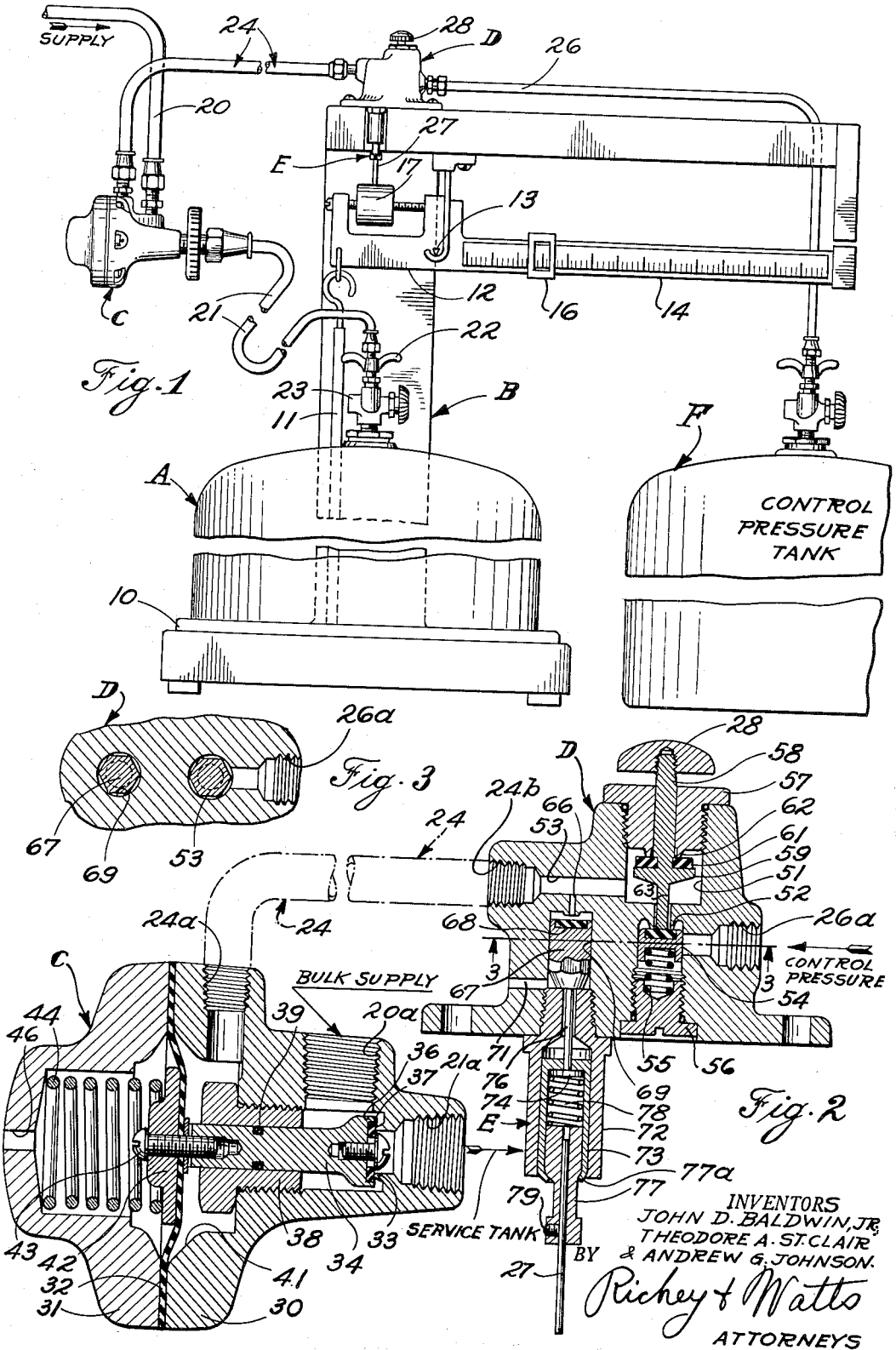

2,751,181
AUTOMATIC FILLER UNIT

John D. Baldwin, Jr., Highland Heights, Theodore A. St. Clair, South Euclid, and Andrew G. Johnson, Lakewood, Ohio, assignors to The Weatherhead Company, Cleveland, Ohio, a corporation of Ohio Application October 11, 1950, Serial No. 189,534

4 Claims. (Cl. 249—63)

This invention relates to apparatus for filling pressure vessels with fluid under pressure, including means for cutting off the supply of fluid to the vessel when a predetermined quantity of fluid has been admitted to the vessel.

This invention is particularly useful in connection with the filling of cylinders with liquefied petroleum gas under pressure. In the liquefied petroleum gas industry a large number of individual tanks or cylinders must be filled with the gas and supplied to the consumers. In order to reduce the labor cost of filling such tanks and in order to accurately determine the amount of gas introduced into the cylinders, it has been proposed to provide a scale for receiving the tank during the filling operation, which scale measures the quantity of gas admitted to the tank or cylinder by weighing the same. Control means are associated with the scale and the shut-off valve for the source of supply so that when the proper weight is admitted to the cylinder, as determined by the setting of the scale beam weights, the source of supply is automatically shut off whereupon the filled cylinder may be disconnected and a new one placed upon the scale.

It has also been proposed to provide pressure-responsive valves or the like for controlling such a system, the actuation of the valves being by means of a control pressure or pressures, the system being under the control of the operator and responsive to manipulation of a push button or the like. Systems of this type reduce the labor cost involved in filling the cylinders because they automatically shut off the source of supply and eliminate the need on the part of the operator for continuously watching the scale beam. Thus, one operator may control a battery of filling devices without fear of overfilling any of the tanks.

The principal object of the invention resides in improving the accuracy of the metering obtainable by a weight-responsive system of the type referred to, and in making the action of such a system more sensitive and direct in its response to the signal given by the weight-responsive means that the container has been filled with the prescribed amount of fluid under pressure. Briefly, these objects are accomplished by providing a system that includes a normally-closed shut-off valve for charging the cylinder, which valve may be opened by applying what is referred to as a control pressure thereto. The valve is so arranged that so long as control pressure is applied thereto, it will remain open and the cylinder will receive a charging supply of gas.

Also in the system is a manually-controlled valve connected to a source of control pressure, such as pressure tank or another tank of liquefied petroleum gas. When the manual valve is actuated the aforesaid control pressure is applied to open the shut-off valve. There is a vent in the control pressure system that is held closed by the weighing apparatus during the filling operation, that is, so long as the tank has not received its prescribed amount of charge. However, when the tank is up to weight, the vent valve automatically opens, its control pressure is instantly relieved, and the spring bias on the shut-off valve snaps the valve shut cutting off the filling operation in immediate response to the signal given by the weighing apparatus. This provides a very direct, accurate, and sensitive system with a minimum number of parts, and insures precise metering.

Other objects of the invention reside in the provision of means for controlling the opening and closing of the vent which are readily adjustable to the particular scale beam or weighing apparatus employed.

Still another object resides in providing a manual control valve for the control pressure which is simple and effective against leakage so that the control pressure will be maintained during the filling operation so long as the vent remains closed.

The manner in which these objects, and other objects more or less ancillary thereto, may be accomplished will be apparent to those skilled in the art from the following detailed description of a preferred embodiment of the invention.

In the drawings:

Fig. 1 is a vertical diagrammatic view of a typical installation embodying the invention, showing the general disposition of the parts;

Fig. 2 is a vertical view showing the shut-off valve and control valve in section as well as the vent and its control means; and, Fig. 3 is a framentary section taken along 3—3 of Fig. 2 showing the non-circular valves.

The general arrangement of the system for accomplishing the invention is shown somewhat diagrammatically in Fig. 1, and reference is made thereto before the constructional details of the control valves are described. The major elements of the system comprise a tank or cylinder A which, for example, is being charged with liquefied petroleum gas, a scale B for weighing the amount of charge supplied to the tank, a shut-off valve C for admitting gas under pressure to the tank from the source of supply, a control valve D for starting the charging operation, sensing means E associated with the scale for shutting off the supply, and a source of control pressure, such as the tank F which has been previously charged with liquefied petroleum gas, compressed air, or the like.

The tank A to be filled is placed upon the platform 10 of a suitable scale or weighing device B, and the weight of the tank is exerted through tension means, such as 11. There is a poise or scale beam 12 which is supported on knife edges 13 for pivotal motion on the frame of the scale. Arm 14 is fitted with a weighed rider 16 for making the fine adjustments to determine the amount of charge to be admitted to the tank A. A coarse adjustment weight 17 is also provided on the arm, it being understood that the details of the scale or weighing device in and of themselves form no part of the present invention except insofar as the scale enters into this novel combination.

A line 20 leads from a suitable source of supply of fluid under pressure, such as liquefied petroleum gas, and forms the inlet to the shut-off valve C. The outlet of the valve C is connected by means of a line 21, preferably a flexible hose, to a quick-connector nipple assembly 22, which is attached to a cylinder valve 23 mounted on the cylinder A. Another flexible hose 24 leads from the control valve D to the shut-off valve C, and is the means for conducting the control pressure to the shut-off valve C. Line 26 leads from the control pressure tank A to the control valve D.

Sensing means E, which includes a pin 27, are mounted, in a preferred embodiment of the invention, on the control valve D, pin 27 being arranged so that when the tank is empty, weight 17 contacts the pin and exerts a lifting action thereupon. Control valve D is furnished with manual means for initiating the cycle after the tank A is connected, this being in the form of a small button 28 mounted on the valve D.

Briefly, the action of the system may be described as follows: An empty tank A is placed upon the scale and the connection at 22 is made to connect the tank to the shut-off valve C. At this time the tank will be overbalanced by the arm 14 of the poise, and the weight 17 will be urged upwardly in the drawing, thereby being pressed against sensing pin 27. When the filling cycle is to be started the operator presses button 28 which conducts control pressure to the valve C via the control valve D, and opens the source of supply to line 21, and the charging of the tank begins. The system is arranged so that the button 28 need only be pressed momentarily as charging continues automatically after the button is released. As the tank is filled nothing changes in the scale until the poise or balance point has been reached, at which time the predetermined charge will have been forced into the tank. Now the tank can overcome the weight of the arm 14 and rider 16. Weight 17 on the poise falls away from the sensing pin 27. This vents the control pressure in line 24, which, as will be seen presently, automatically and quickly shuts off the supply from the tank. The filled tank A may then be disconnected, another take its place upon the scale platform, and the cycle repeated.

Referring to Fig. 2, a preferred construction for the shut-off valve C may be seen. The valve C includes two body parts 30 and 31 which are clamped together against a diaphragm 32 by suitable screws not shown in the view. Body part 30 has an inlet port 20a threaded to make connection with the supply line 20. An outlet port 21a is threaded to make connection with the delivery line 21 leading to the cylinder to be charged. Between these ports is a valve seat 33 which cooperates with the movable valve member 34. The valve member has an enlarged head portion 36 which mounts a soft sealing washer 37 for engaging the valve seat 33 and isolating the inlet port 20a from the outlet port 21a. The stem of the valve member is slidably mounted in a removable bushing 38 and sealed against the bore therethrough by means of an O-ring or suitable seal 39.

Body part 30 is formed with a pocket 41 which, in connection with the pressure-responsive means, namely the diaphragm 32, forms a pressure chamber which is in communication with the control inlet port 24a. This port connects to the line 24 for conducting control pressure from the control valve D to the shut-off valve C. The valve member 34 is fastened for motion with the diaphragm 32 by a washer 42 and a screw 43. The valve member is urged toward its closed position by a spring 44 disposed in the body part 31, the spring chamber being vented to atmosphere as at 46. From the structure just described, it will be apparent that when atmospheric pressure obtains in the pressure chamber 41, spring 44 urges the valve member to its closed position to isolate the bulk supply from the service tank being charged.

Referring again to Fig. 2, the control valve D comprises a body having formed therein inlet port 26a threaded for connection to the line 26 that conducts control pressure from the tank F to the control valve D. Also in the body is a chamber 51 in communication with inlet port 26a, there being a valve seat 52 disposed between the inlet port and the chamber. Leading from the chamber 51 is a passageway 53 in communication with threaded outlet port 24b for connection with line 24 leading to the shut-off valve C. Communication between the inlet port 26a and the chamber 51 is normally blocked by a spring-loaded check valve 54 having a soft seal for engaging the valve seat 52, and urged toward its closed position by a spring 55 backed up by a nut 56 threaded in the body of the valve D.

Manual means are provided to momentarily open the check valve 54. For this purpose a bushing 57 is threaded into the valve body and slidably receives a stem 58 which has a flange 59 disposed within the chamber 51, and carries a soft seal 61 for engaging a valve seat 62 surrounding the bore in the bushing that receives the stem 58. An extension 63 of the stem is disposed adjacent the check valve 54 to open the same, and a button 28 may be provided on the stem to facilitate manipulation of the valve 54. In the preferred construction the spring 55 serves not only to close the check valve 54, but the two seals described are soft enough so that the check valve 54 holds the seal 61 on the stem lightly against the seat 62. It can be seen that when fluid under pressure is disposed in chamber 51, such fluid will act upon the area represented by the valve seat 62, and therefore urge the valve flange 59 and its seal 61 tightly against valve seat 62, thereupon insuring against leakage past the push button stem 58. As seen in Fig. 3, valve member 63 is preferably of non-circular construction so that control pressure has no effect upon its being balanced against the valve.

An important feature of the apparatus is the automatically-controlled vent to relieve the control pressure and permit the spring in the shut-off valve C to shut off the source of supply from the cylinder when charging is completed. Although the vent that accomplishes this purpose may be located anywhere so long as it communicates with the chamber in the shut-off valve C, in the preferred construction the vent is incorporated in the control valve D, and the control valve is mounted on the scale itself. The vent is, by means of port 66, formed in the wall surrounding the outlet port 53 of the control valve D, and the non-circular, plunger-like vent valve 67 has a sealing disc 68 attached thereto and is slidably mounted in a bore 69 in the valve body. The vent valve 67 is arranged to be held against a seat surrounding vent 66 to trap control pressure in the two chambers and the valves C and D. Vent 71 is provided to establish communication of vent 66 to atmosphere.

The operating or sensing means E for the vent valve 67 is mounted in a tube 72 threaded into the valve body. Slidable in a bore in the tube is a sleeve-like member 73, and slidable in the sleeve is a plunger 74 having a flange 74a and an extension or pin 76 for engaging the valve 67. Also in the sleeve is a thimble 77, and thimble 77 and plunger 74 are urged apart by a spring 78. Thimble 77 is retained by a spun-over lip 77a formed on the sleeve 73. An adjustable extension in the form of a wire-like pin 27 is slidable in member 77, and held in the adjusted position by a set screw 79. Extension pin 27 is set so that the valve 67 will be held closed so long as the elongated arm of the scale beam is in its down or unbalanced position. The aforesaid spring and plunger arrangement provides for a certain amount of over-travel with the scale beam without unduly straining the material of the seat or the vent valve 67, or bending of the pin 27.

The operation of the preferred embodiment of the invention will now be briefly described. As seen in Fig. 1, an empty tank A is placed upon the platform 10 of the scale B, and the charging connection to the tank is made by means of the connection at 22. The other connections, namely the connection of line 20 to the source of supply, and line 26 to the control pressure tank F, are permanent until such sources are exhausted so that for normal operation the only connection that need be made is that at the tank to be filled. After this connection is made the operator presses button 28. This opens the valve 63 in the control valve that admits control pressure to the chambers of both valves C and D. The operator need only momentarily press button 28, that is he may at once release it, and the control valve D causes pressures to be trapped in the aforesaid chambers. Control pressure in chamber 51 being against the end of the control valve plunger, urges the sealing member 61 against the valve seat 62, and prevents leakage from around the stem 58. Control pressure in the pressure chamber of shut-off valve C acts against diaphragm 32, which serves as piston means, to open the valve member 34 against the force of the spring 44, thereby connecting the bulk supply to the service tank A to be filled. Since the tank is not up to weight, the right-hand or long arm of the scale beam is lowered, which lifts the adjustable weight 17 and urges it against pin 27, holding the vent valve 67 closed and trapping the control pressure as mentioned. When the proper amount of fluid under pressure has been admitted to the tank A, its weight equals that for which the scale is set and the scale beam comes to balance. This moves weight 17 away from extension pin 27 whereupon the control pressure, acting through the small port 66, forces the valve 67 away from the port and vents the control pressure to atmosphere through the vent port 71. Now spring 44 may immediately snap the valve member 34 shut, thereby providing almost instantaneous metering or control action.

Furthermore, fluid flow around and past the enlarged head 36 of the valve member 34 in shut-off valve C is such as to tend to cause the valve member 34 to close, so that when control pressure is exhausted from the diaphragm chamber the final flow of fluid assists the action of the spring in snapping the valve member 34 shut. Since the control pressure is appreciably higher than atmospheric pressure, spring 44 may be made quite strong which gives a very quick action. Also, the connections are relatively direct, and the system whereby a relatively high pressure is vented to atmosphere to initiate shut-off is a relatively quick one because, since the system is closed, as soon as the slightest amount of fluid exhausts through the vent pressure drops immediately in the chamber of shut-off valve member 34 and the valve member 34 starts to shut immediately. This is a faster acting system than one employing the principle of building up pressure in a system to cause actuation.

It will be understood that although the vent is shown as part of the control valve unit, which unit is mounted on the scale beam, it is merely the preferred construction and the vent and its sensing means may be entirely separate from the other units.

Having completed a detailed description of a preferred embodiment of the present invention so that others skilled in the art may be able to understand and practice the same, we state that what we desire to secure by Letters Patent is not limited by said preferred embodiment but rather is defined in what is claimed.

What is claimed is:

1. Apparatus for filling containers with fluid under pressure comprising a shut-off valve having a body, an inlet port adapted for connection to a source of fluid under pressure, an outlet port adapted for connection to a container to be filled, a normally-closed valve for isolating said ports, a pressure chamber in said body, piston means connected to said valve and defining a wall portion of said chamber, and an inlet control port for said chamber whereby fluid pressure in said chamber opens said valve; a control valve having a body, a control chamber therein, an inlet port for said control chamber adapted for connection to a source of fluid under control pressure, a normally-closed valve for isolating said inlet port and control chamber, control means for opening said valve, and an outlet port for said control chamber; means connecting said control ports to place said chambers in communication, an atmosphere vent for said chambers, a vent valve for said vent, and independent second control means adapted for operation by a container-weighing device for holding said vent valve closed during filling of a container to maintain control pressure in the chambers of said valves.

2. Apparatus for filling containers with fluid under pressure comprising a shut-off valve having a body, an inlet port adapted for connection to a source of fluid under pressure, an outlet port adapted for connection to a container to be filled, a normally-closed valve for isolating said ports, a pressure chamber in said body, piston means connected to said valve and defining a wall portion of said chamber, and an inlet control port for said chamber whereby fluid pressure in said chamber opens said valve; a scale having a platform to receive a container and a scale beam, a control valve mounted on said scale adjacent said scale beam and having a body, a control chamber therein, an inlet port for said control chamber adapted for connection to a source of fluid under control pressure, a normally-closed valve for isolating said inlet port and control chamber, control means for momentarily opening said valve, and an outlet port for said control chamber; means connecting said control ports to place said chambers in communication, an atmosphere vent for said chambers, a vent valve for said vent, and plunger means independent of said control means disposed for engagement by said scale beam and arranged to hold said vent valve closed while the scale beam is unbalanced during filling of a container to maintain control pressure in the chambers of said valves, the momentary opening of said valve admitting fluid under pressure into said chambers, the closing of said valve after said momentary opening isolating the fluid in said chambers from the source of fluid under pressure.

3. In a device of the class described, a shut-off valve, means biasing said shut-off valve to closed position, an expansible chamber connected to said shut-off valve to open the same when said chamber is expanded by fluid pressure, a source of pressure fluid, a control valve having an inlet connected to said source and an outlet connected to said expansible chamber, operating means for momentarily opening said control valve to admit pressure fluid from said source to said chamber to expand the same and open said shut-off valve, said control valve, when closed, acting to trap pressure fluid in said chamber and hold said shut-off valve open, and a vent valve adapted to be opened by a movable condition-responsive device to vent the pressure fluid trapped in said chamber and to close said shut-off valve.

4. A fluid handling system comprising a source of fluid under pressure, and a container adapted to receive fluid under pressure, connecting means connecting said source of said fluid under pressure to said container, said connecting means including a shut-off valve for isolating said source and container, pressure responsive means for opening said shut-off valve when fluid under pressure is applied thereto, a source of control fluid under pressure, operating means for momentarily admitting control fluid under pressure to said pressure responsive means from said source of control fluid under pressure, said operating means isolating said pressure responsive means and source of control fluid under pressure after the momentary operation confining the control fluid under pressure admitted during the momentary operation within said pressure responsive means, and a vent valve adapted to be opened by a movable condition responsive device to release the control fluid under pressure in said pressure responsive means and close said shut-off valve.

References Cited in the file of this patent
UNITED STATES PATENTS

| Number | Name | Date |
| --- | --- | --- |
| 447,140 | Thayer | Feb. 24, 1891 |
| 896,120 | Kramer | Aug. 18, 1908 |
| 1,007,915 | Broadhurst | Nov. 7, 1911 |
| 1,201,164 | Ferguson | Oct. 10, 1916 |
| 1,444,189 | Key | Feb. 6, 1923 |
| 1,897,135 | Mason | Feb. 14, 1933 |
| 2,037,023 | Holby | Apr. 14, 1936 |
| 2,039,638 | Druge | May 5, 1936 |
| 2,124,811 | Bennett | July 26, 1938 |
| 2,134,669 | Page | Oct. 25, 1938 |
| 2,173,619 | Ames | Sept. 19, 1939 |
| 2,264,562 | Bryant | Dec. 2, 1941 |
| 2,387,894 | Fannin | Oct. 30, 1945 |
| 2,406,263 | St. Clair | Aug. 20, 1946 |
| 2,408,842 | Garretson | Oct. 8, 1946 |
| 2,505,333 | Mead | Apr. 25, 1950 |
| 2,544,734 | St. Clair | Mar. 13, 1951 |
| 2,545,118 | St. Clair | Mar. 13, 1951 |